(12) United States Patent
Broman et al.

(10) Patent No.: US 9,934,315 B2
(45) Date of Patent: Apr. 3, 2018

(54) METHOD AND SYSTEM FOR WEB SEARCHING

(71) Applicant: EXCALIBUR IP, LLC, New York, NY (US)

(72) Inventors: Paul Alex Broman, Maitland, FL (US); David Watanabe, Alberta (CA); Ariel Seidman, Menlo Park, CA (US)

(73) Assignee: EXCALIBUR IP, LLC, New York, NY (US)

( * ) Notice: Subject to any disclaimer, the term of this patent is extended or adjusted under 35 U.S.C. 154(b) by 0 days.

(21) Appl. No.: 15/332,774

(22) Filed: Oct. 24, 2016

(65) Prior Publication Data

US 2017/0068740 A1    Mar. 9, 2017

Related U.S. Application Data

(63) Continuation of application No. 12/395,931, filed on Mar. 2, 2009, now Pat. No. 9,477,763.

(51) Int. Cl.
*G06F 17/30*        (2006.01)
*G06F 3/0481*        (2013.01)

(52) U.S. Cl.
CPC ...... *G06F 17/30867* (2013.01); *G06F 3/0481* (2013.01); *G06F 17/30873* (2013.01); *G06F 17/30887* (2013.01)

(58) Field of Classification Search
None
See application file for complete search history.

(56) References Cited

U.S. PATENT DOCUMENTS

| | | |
|---|---|---|
| 6,292,796 B1 | 9/2001 | Drucker et al. |
| 6,460,060 B1 | 10/2002 | Maddalozzo, Jr. et al. |
| 6,505,196 B2 | 1/2003 | Drucker et al. |
| 6,728,706 B2 | 4/2004 | Aggarwal et al. |

(Continued)

OTHER PUBLICATIONS

The Mozilla Blog: News, notes and ramblings from the Mozilla project; A Little Something Awesome about Firefox 3; Mary Colvig; Apr. 21, 2008; http://blog.mozilla.com/blog/2008/04/21/a-little-something-awesome-about-firefox-3/.

(Continued)

*Primary Examiner* — Christopher J Raab
(74) *Attorney, Agent, or Firm* — James J. DeCarlo; Greenberg Traurig, LLP

(57) ABSTRACT

A method and system for providing personalized search results is disclosed. A computer receives input from a user to navigate to a web site (either directly or as a result of choosing a result from a search result page). The computer navigates to the web site and stores information about the web site in a file. The computer determines web sites associated with a search query of the user as the search query is being entered into a search area of a user interface. The associated web sites are sites that have been previously navigated to by the user. The determining step includes obtaining the web sites associated with the search query from a data structure previously generated from the file. The data structure includes parsed entries of URLs associated with the previously navigated web sites. Based on the determining step, web site links corresponding to the associated web sites are displayed as the search query is being entered.

19 Claims, 5 Drawing Sheets

(56) References Cited

U.S. PATENT DOCUMENTS

| | | |
|---|---|---|
| 7,092,936 B1 | 8/2006 | Alonso et al. |
| 7,216,292 B1 | 5/2007 | Snapper et al. |
| 7,424,476 B2 | 9/2008 | Apparao et al. |
| 7,502,779 B2 * | 3/2009 | Brockway ......... G06F 17/30864 |
| 7,546,234 B1 * | 6/2009 | Deb ................... G06F 17/2785 |
| | | 704/4 |
| 7,634,463 B1 | 12/2009 | Katragadda et al. |
| 7,685,144 B1 | 3/2010 | Katragadda |
| 7,752,326 B2 | 7/2010 | Smit |
| 7,836,009 B2 | 11/2010 | Paczkowski et al. |
| 9,069,792 B1 * | 6/2015 | Craighead ........... G06F 17/3023 |
| 2002/0143759 A1 | 10/2002 | Yu |
| 2004/0153467 A1 | 8/2004 | Conover et al. |
| 2004/0199496 A1 | 10/2004 | Liu et al. |
| 2005/0125391 A1 | 6/2005 | Curtis et al. |
| 2005/0132296 A1 | 6/2005 | Milic-Frayling et al. |
| 2005/0278317 A1 | 12/2005 | Gross et al. |
| 2006/0074853 A1 | 4/2006 | Liu et al. |
| 2006/0074883 A1 | 4/2006 | Teevan et al. |
| 2006/0112178 A1 * | 5/2006 | Van Vleet ......... G06F 17/30867 |
| | | 709/224 |
| 2006/0136589 A1 | 6/2006 | Konig et al. |
| 2006/0218111 A1 | 9/2006 | Cohen |
| 2006/0224587 A1 | 10/2006 | Lamir et al. |
| 2006/0224615 A1 | 10/2006 | Korn et al. |
| 2006/0277189 A1 | 12/2006 | Cencini |
| 2007/0266025 A1 * | 11/2007 | Wagner ............. G06F 17/30867 |
| 2008/0010271 A1 * | 1/2008 | Davis ................. G06F 17/30625 |
| 2008/0091708 A1 * | 4/2008 | Caldwell ............. G06F 17/3089 |
| 2008/0104045 A1 | 5/2008 | Cohen et al. |
| 2008/0109422 A1 | 5/2008 | Dedhia |
| 2008/0140655 A1 | 6/2008 | Hoos et al. |
| 2009/0171930 A1 * | 7/2009 | Vaughan ........... G06F 17/30876 |
| 2011/0225254 A1 | 9/2011 | Atkins et al. |
| 2012/0159317 A1 | 6/2012 | DiCocco et al. |
| 2013/0144861 A1 | 6/2013 | Bennett |

OTHER PUBLICATIONS

Pretschner et al., Ontology Based Personalized Search, Nov. 1999, Proc. 11th IEEE Intl. Conf. on Tools with Artificial Intelligence, pp. 391-398, Chicago.

Pitkow et al., Personalized Search: A contextual computing approach may prove a breakthrough in personalized search efficiency, Sep. 2002, Communications of the ACM, vol. 45, No. 9, pp. 50-55.

* cited by examiner

METHOD AND SYSTEM FOR WEB SEARCHING

This application is a continuation of and claims priority to U.S. Pat. No. 9,477,763, filed on Mar. 2, 2009, entitled "Personalized Search Results Utilizing Previously Navigated Web Sites", which is hereby incorporated by reference in its entirety.

FIELD

The present disclosure relates to web searching and, more specifically, to personalized web searching.

BACKGROUND

With the increase in the number of web sites available via the World Wide Web, web searching has become more and more important for users to locate particular web pages. One way a user finds a particular web page is by typing one or more search terms into a search area of a web page or a browser. A web page with the results of the search is then displayed to the user. Results of a search typically include a list of web links to web pages relevant to the search terms. The user can then navigate to a web page of interest.

Current web searching techniques are typically not personal to the user. In particular, the results of a search are the same for different users who enter the same search query. For example, if a first user on a first computer performs a search for a particular term, the results of the search are the same as the results of a search for the same particular term performed by a second user on the first computer (or any other computer) when the first and second users use the same search engine.

The relevancy of search results to a user may be compromised because the search results are not personalized for the user. For example, a user may search for a first search term using a search engine. A result of interest for the user may be found on the fifth page of search results. At a later time, if the user wants to again search for the first search term in order to navigate to the result of interest, the user has to again navigate to the fifth page of search results in order to see the result of interest. This presents a waste of time for the user. Further, users may forget the exact query that they used to find specific information previously. If this occurs, it may take a user multiple queries to find the information again. This also presents a waste of time for the user. Therefore, there remains a need to personalize search results for a user when the user performs a web search.

SUMMARY

The present disclosure relates to a method and system for providing personalized search results for a user. A computer accessible via a network and having a display receives input from the user to navigate to a web site. The computer navigates to the web site and stores information about the web site in a file. The navigating and storing steps are repeated for each requested web site. The computer then determines web sites associated with a search query of the user as the search query is being entered by the user into a search area of a visibly displayed user interface of an application program executed by the computer. The associated web sites are sites that have been previously navigated to by the user. The determining step includes obtaining the web sites associated with the search query from a data structure previously generated by the computer from the file. The data structure includes parsed entries of Uniform Resource Locators (URLs) associated with the previously navigated web sites. Based on the determining step, web site links corresponding to the associated web sites are visibly displayed on the display as the search query is being entered. The web site links include information previously collected for the web sites and available via the network.

In one embodiment, the information previously collected for the web sites includes a URL of each web site in the associated web sites. In one embodiment, the obtaining step further includes, for each URL entry associated with a web site, adding an entry to the data structure for each search term associated with the URL, for each URL entry associated with a web site, parsing a title of the entry into tokens, for each URL entry associated with a web site, tokenizing its domain name into a plurality of words, for each URL entry having its domain name tokenized, adding the plurality of words to the data structure for the URL, for each URL entry having a filename, tokenizing the filename, and adding the filename to the data structure for the each URL entry having the filename.

In one embodiment, the storing step further includes determining that the navigating to the web site includes predetermined characteristics, such as determining that a back button has been clicked within a predetermined amount of time after navigating to the web site, determining that a new window or tab has been selected within a predetermined amount of time after navigating to the web site, detecting a new navigation request not associated with the web site within a predetermined amount of time after navigating to the web site, and receiving a new search query entered by the user into the search area of the visibly displayed user interface of the application program within a predetermined amount of time.

In one embodiment, the data structure is sorted by search terms. In one embodiment, another data structure is generated. This data structure includes each entry from the file once and provides metadata for the received URLs. In one embodiment, a weight is calculated for each entry in the data structure. In one embodiment, the search query is matched with terms in the data structure to determine the web sites associated with the search query.

In one embodiment, the information previously collected for the web sites includes a number of times that the URL has been visited by the user, a timestamp of a most recent visit by the user, a title of the each web site at the URL, and/or a search term used to reach the URL.

These and other aspects and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Figure 1:
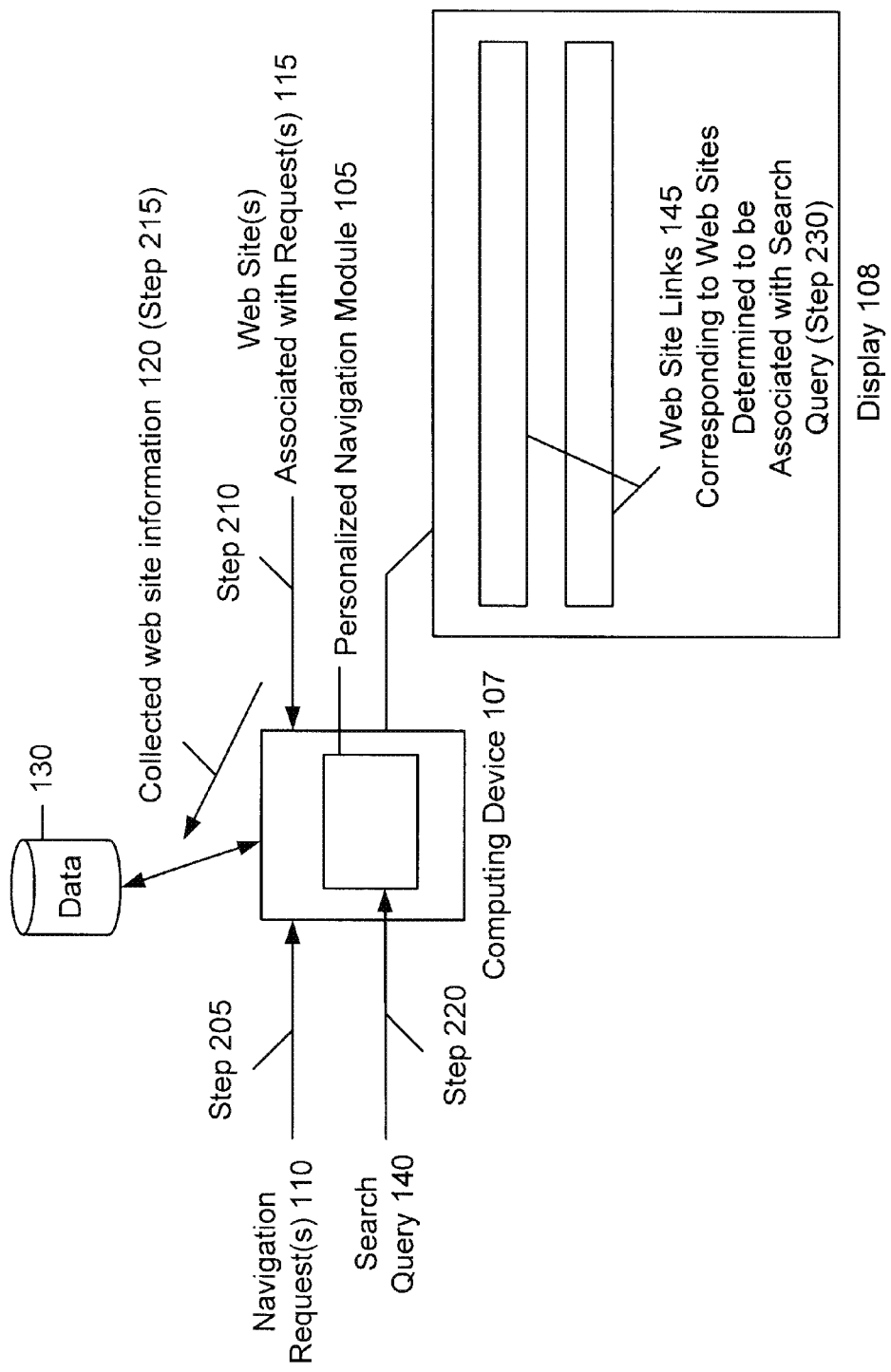
FIG. 1 is a block diagram of a personalized navigation module executing on a computing device to provide a personalized navigation feature for users of the computing device in accordance with an embodiment of the present disclosure.

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the invention that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Figure 2:
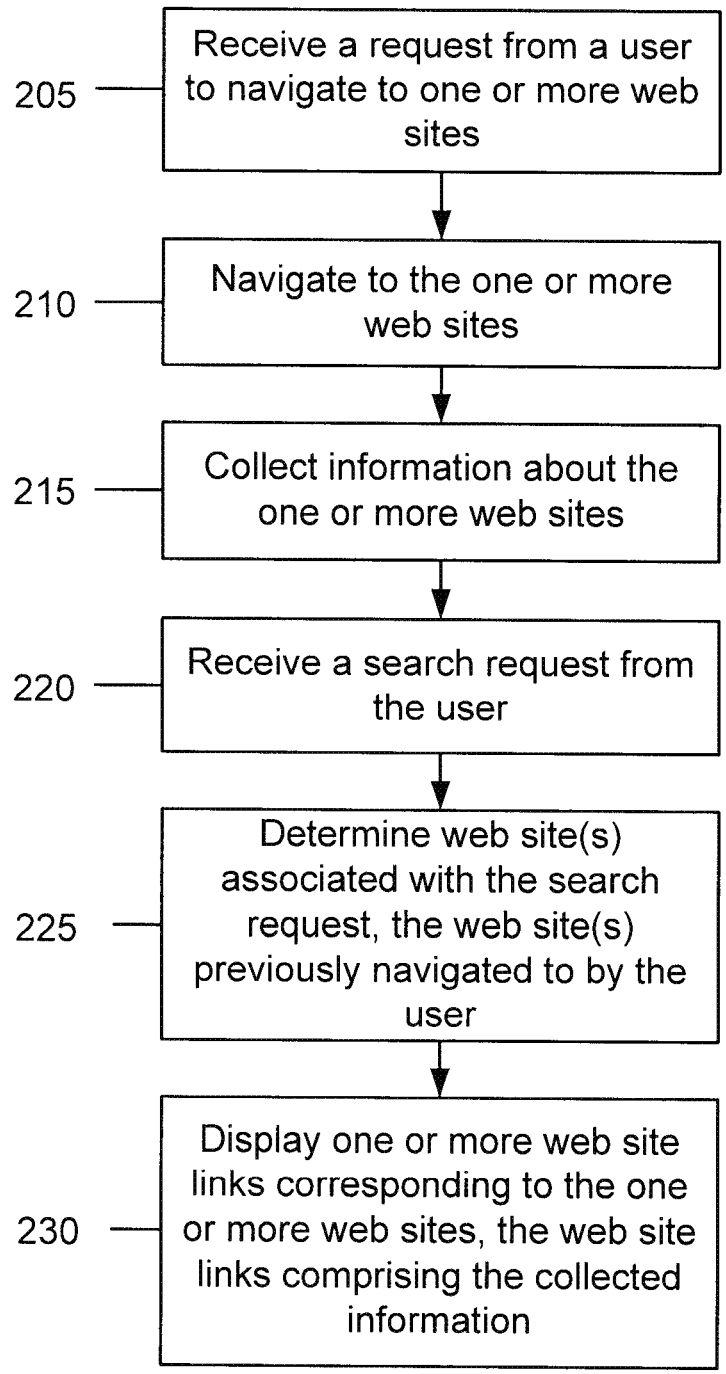
FIG. 2 is a flowchart of the steps performed by the computing device of FIG. 1 in accordance with an embodiment of the present disclosure.

FIG. 1 shows a block diagram of an embodiment of a personalized navigation module 105 executing on a computing device 107 to perform web searching. FIG. 2 is a flowchart illustrating an embodiment of the steps performed by the personalized navigation module 105. The personalized navigation module 105 can be software, hardware, firmware, or any combination of software, hardware, and/or firmware. The computing device 107 is a computer that is accessible via a network, such as the Internet. For purposes of this disclosure, a computer or computing device such as the computing device 107 includes a processor and memory for storing and executing program code, data and software (e.g., personalized navigation module 105) which may be stored or read from computer readable media. Computers can be provided with operating systems that allow the execution of software applications in order to manipulate data. Personal computers, personal digital assistants (PDAs), wireless devices, cellular telephones, internet appliances, media players, home theater systems, servers, and media centers are several non-limiting examples of computing devices. The computing device 107 also includes a display 108, such as a screen or monitor.

A user submits one or more navigation requests 110 (step 205) to the computing device 107 to navigate to one or more web sites. A navigation request 110 can be entered into a browser by the user as, for example, a Uniform Resource Locator (URL). In response to receiving a navigation request 110, the computing device 107 navigates to the requested web site 115 (step 210). For each web site that the user requests and that the computing device 107 navigates to, the computing device 107 (e.g., the personalized navigation module 105) collects web site information 120 about the web site in step 215. The web site information 120 can include the URL itself, the number of times that the user has visited that URL, the timestamp of the most recent visit, the title of the page at that URL (obtained either from search results or from the <title> tag of the web page itself), and/or the search term(s) the user has used to reach this URL destination. The computing device 107 stores the collected web site information 120, such as in memory or in a database 130. In one embodiment, the computing device 107 stores the collected web site information 120 for the user in a local XML file. In another embodiment, the XML file is stored external to the computing device 107, such as at a remote server. In one embodiment, this file has an XML file format, but it can be any type of file format (e.g., JSON, etc.).

The user then enters a search query 140 (step 220) into a search area of a visibly displayed user interface of an application program (e.g., personalized navigation module 105) executed by the computing device 107. For example, the search area may be a dialog box that is part of a web browser displayed by the computing device 107. As the search query is being entered into the search area by the user, the personalized navigation module 105 determines (step 225) one or more web sites associated with the search query, the web site(s) previously navigated to by the user. The personalized navigation module 105 then displays on the display 108 one or more web site links 145 corresponding to the one or more web sites determined to be associated with the search query (step 230). The web site links 145 are visibly displayed on the display 108 (e.g., in a popup box) as the search query 140 is being entered. In one embodiment, each web site link 145 includes one or more pieces of information previously collected for the web site associated with the web site link 145, such as its URL. If the user is interested in navigating to one of the web sites associated with a displayed web site link, the user can, in one embodiment, use the mouse associated with the computing device 107 to click on the web site link. Alternatively, the user can also use their keyboard up/down arrow keys with the enter key to select the web site link.

The web site links 145 determined by and displayed by the personalized navigation module 105 represents navigation personalized for the user. Personalized navigation is the resurfacing of a user's past activity back to them as "instant search results". Specifically, the personalized navigation module 105 tracks the activity that the user seems interested in and provides that activity back to the user later if the user enters keywords into the search area that are related to the earlier experience.

In one embodiment, the personalized navigation module 105 attempts to improve a user's overall navigation of the web by "understanding" the user's overall navigation habits (e.g., search logs, bookmarks, and address bar inputs) and then re-ranks the user's search results based on the user's navigational habits. In one embodiment, the personalized navigation module 105 can match based on any address bar, search query, and/or user-specific associated web location, such as a favorite site or bookmark. Further and as described in more detail below, the personalized navigation module 105 parses out key terms from a URL to avoid matching against irrelevant URLs.

In more detail and in one embodiment, the personalized navigation module 105 tracks a navigation and makes an entry in its local XML file when any of the following events occur:

1. The user selects an instant search result served in the display 108. In one embodiment, the personalized navigation module 105 can store one or more of the URL, title (e.g., obtained from the server that provided the instant search results), timestamp, and can increment the number of times that the web site being visited has been visited by the user.

2. The user types a URL in the address bar and navigates to the resulting page. In one embodiment, the personalized navigation module 105 can store the URL, title (obtained from the document object model (DOM), since the web page is being navigated), timestamp, and can increment the number of times the web page has been visited by the user. In one embodiment, the personalized navigation module 105 detects this by registering for a browser's pre-navigation callback. In one embodiment, the personalized navigation module 105 determines if the web search is from the address bar edit box. If so, in one embodiment the navigation came from the user typing text into or pasting text into the address bar. In one embodiment, the personalized navigation module 105 registers for a pre-navigation callback as well as a post-navigation callback since it is only at that "navigate complete" point when the personalized navigation module 105 has a DOM with the page title in it. That post-navigation callback acts because of a flag set by the earlier pre-navigation call.
3. The user clicks on a search suggestion or a search history element on the computing device display 108, and then clicks a result on the search results page. The personalized navigation module 105 can store the search term that the user used to get to the search results page, the URL, title (obtained from the DOM, since the page is being navigated), timestamp, and can increment the number of times that the web page has been visited. In one embodiment, instead of a single search term, the personalized navigation module 105 maintains a semicolon-delimited list of all the search terms that were used by the user to get to this entry. The personalized navigation module 105 stores in memory the most recently navigated web page and the web page displayed just before that one in order to detect the user hitting the "back" button (in which case, the navigation is not recorded). In one embodiment, the personalized navigation module 105 includes a blacklist of URL templates (with wildcard substitution characters) that is compared to the URL that the user is navigating. In one embodiment, the personalized navigation module 105 uses regular expression matching to determine if there is a match between the URL navigation and one of these blacklist templates. In one embodiment, if there is a match, the navigation is not recorded to prevent erroneously tracking user clicks on such things as help, login, etc.
    a. In one embodiment, the personalized navigation module 105 maintains a list of search result page templates. These templates can be used to capture search terms from the browser (e.g., when a user navigated to search pages on Yahoo®, Google®, etc.). These templates can be used to determine if the page the user navigates to from the search results page looks like another search results page (such as the user clicking page 2). In one embodiment, the navigation is not recorded but the flag is kept on to indicate that the personalized navigation module 105 should record the next navigation (provided it is not the "back" button or a blacklisted URL).

```
<searchProviders>
    <provider name="Yahoo" domain="search.yahoo.com"
    path="/search" termParam="p"/>
    <provider name="Google" domain="www.google.com"
    path="/search" termParam="q"/>
```

-continued

```
    <provider name="Live" domain="search.live.com"
    path="/results.aspx" termParam="q"/>
    <provider name="Ask" domain="www.ask.com" path="/web"
    termParam="q"/>
</searchProviders>
```

In one embodiment, the personalized navigation module 105 uses code that "cracks" the URL into the domain and path (e.g., using a Win32 URL cracking call), and then checks for a domain match and a path that starts with the given path. For example, the personalized navigation module 105 needs to identify "search.yahoo.com" as the domain and a path that begins with "/search" to determine that a URL is a Yahoo® search URL. In one embodiment, the personalized navigation module 105 looks for the term "param" in the path based on the name of the parameter (termParam) being used by that particular search engine and finds the term at that parameter position. If the term matches the term that the user is searching for, then the personalized navigation module 105 determines that this is a "more results" navigation case.

No matter which of these three circumstances caused the personalized navigation module 105 to track the navigation, in one embodiment the personalized navigation module 105 stores the same type of data to the same location in the XML file (except that there is only a "search term" to record in the third case), and the personalized navigation module 105 increments the "visit" count by one for any existing entry that may be there. The first time a user navigates to mysite.org, the user may do so from the address bar. The second time the user navigates to mysite.org, the user may get there by clicking on an instant search result displayed by display 108. In either case, the personalized navigation module 105 may modify the same entry in the XML file, and that entry may then show three visits (with the timestamp of whichever visit was most recent). If the title obtained for each of these scenarios is slightly different (such as a discrepancy between the title contained in the server results for an instant search result versus the title obtained by looking directly at the page DOM), each time the visit count is increased, the personalized navigation module 105 can also replace the title with the title received (if any).

Below is an example of the contents of the stored XML file after some navigations have been tracked:

```
<visits>
    <entry key="http://www.nada.org/"
    visits="3" lastVisit="Thu, 07 Aug 2008
    10:40:40 GMT" title="National
    Automobile Dealers Association"
    terms="nada;"/>
    <entry key="http://www.alleyinsider.com/"
    visits="1" lastVisit="Thu, 07 Aug
    2008 10:53:01 GMT" title="Silicon Alley Insider"/>
    <entry key="http://www.corvettemuseum.com/"
    visits="2" lastVisit="Thu, 07
    Aug 2008 14:28:09 GMT" title=
    "National Corvette Museum" terms="corvette;"/>
    <entry key="http://www.cnn.com/"
    visits="2" lastVisit="Thu, 07 Aug 2008
    15:25:59 GMT" title="CNN.com - Breaking
    News, U.S., World, Weather,
    Entertainment & Video News"/>
</visits>
```

In one embodiment, the personalized navigation module 105 executes an algorithm to attempt to detect cases where the personalized navigation module 105 should not record a site in the XML data file, even though the user performed an action that would result in the personalized navigation module 105 tracking a site in the data file based on the rules above. In one embodiment, the rationale for not including these sites would be a determination by this algorithm that the user did not find value in the site to which they navigated. This can be applied to cases (1) and (3) above that are used to add content to the XML file (in other words, this would apply to all cases except for the case where the user physically types a URL into the address bar). Any one or more of the techniques listed below can be included in the algorithm:

1. Detect a click of the "back" button. If the user clicks the "back" button within a predetermined amount of time (e.g., 5 seconds), the site is not considered (because the user was not happy with the results of the site).
2. Detect closing or moving the UI focus to a different page. If the user closes the active tab or window, or selects a different tab or window, the site is not considered (because the user did not stay on the web page long enough to indicate an interest in it).
3. Detect a new navigation from a link not found on the active page. If the personalized navigation module 105 detects a navigation request within a predetermined amount of time (e.g., 5 seconds), and the user's focus is not within the active page (meaning the navigation didn't come from clicking a link in that page), then don't consider the site (because the user did not stay on the page long enough to indicate an interest in it). In one embodiment, if the user clicked a link on the site that was presented, the user may have found relevance in the site, so include the site in this case).
4. Detect another use of the personalized navigation module 105. If the user types anything in the search box in order to obtain a search again within 10 seconds, even if the user does not select a result displayed by the personalized navigation module 105, the site is not considered (because the user determined quickly that the user still needs to do more searching in order to find what the user was looking for).

In one embodiment, the implementation of these rules involves creating a timer that would prevent any site detected with case (1) or (3) above from being added for a predetermined amount of time (e.g., 10 seconds) after the event occurred, and if any of the above 4 events occur within that time period, the timer would be aborted before it could add the site information to the XML file.

As previously mentioned, the personalized navigation module 105 returns to the user web sites that the user had previously navigated to when the user performs a search that is similar to a navigational act previously performed. In one embodiment, the personalized navigation module 105 does this by generating two binary search trees (BSTs) from the XML data stored in the XML file. Each search tree has a "key" and a corresponding piece of data (which contains all of the details of the entry from the XML, such as the URL, visit count, timestamp, title, etc.).

In one embodiment, one BST is sorted by URL and contains each entry from the XML file exactly once. In one embodiment, the BST is used to provide metadata (visits, timestamps, etc.) for URLs that come from the servers that provide instant search results (in case a URL coming from one of those servers corresponds to a URL that the user has visited). Thus, in one embodiment the personalized navigation module 105 can track visits and timestamps for URLs visited from instant search results.

In one embodiment, the other BST is sorted by terms that a user may type into the search area. In one embodiment, multiple entries may exist in that BST for each physical entry in the XML data. In one embodiment, this BST is the list that is used to provide instant search results for the personalized navigation feature.

In one embodiment, the second BST is generated as follows:
1. Each URL entry in the XML file is reviewed.
2. If that URL has search terms associated with it, an entry is added to this BST for each search term. For example, if three search terms had been used to end up at this URL using data collection method #3 above, three entries are added to this term BST for that one URL.
3. The title (if available) of the entry is then parsed into tokens. An example of the parsing rules are as follows:
   a. Each character in the title is reviewed, and each character is added to the "word" being parsed.
   b. If a character is considered to be a "delimiter character" (which, in one embodiment, includes spaces, dashes, underscores, or any other punctuation symbol), the word being built is assumed to have ended and is added to the BST. In one embodiment, alphanumerics are not checked in order to support non-Latin alphabets.
   c. If a change in text from lowercase to uppercase is seen with no delimiter between them (e.g. between the 'n' and 'O' in 'RunOnText'), in one embodiment it is assumed that the word has ended and a new word is beginning. In one embodiment, the word that is being parsed is added to the BST.
   d. In one embodiment, before a word is added to the BST, that word is compared to a list of "common words". In one embodiment, if that word is on the "common word" list, the word is not added to the term BST.
4. In one embodiment, the domain is extracted from the URL (e.g., throwing away the http:// prefix and the .com, .org, or .gov (etc.) extension). In one embodiment, the remainder of the domain (e.g. "toolbar.yahoo") can be tokenized and those words can be added to the term BST. In one embodiment, the same tokenizing algorithm is used that was used for the title.
5. In one embodiment, the filename (the content after the last slash of the URL) is determined from the URL. That filename can then be tokenized and those words can be added to the term BST. In one embodiment, the same tokenizing algorithm is used that was used for the title.

As the BST described above is generated, in one embodiment an additional piece of data, the weight, is included in the payload data for each BST entry (that contains the data about that URL from the XML file). In one embodiment, this number is used to sort the results (in case more than one URL matched to the same term the user entered).

The weight can be calculated using configurable settings. In one embodiment, the following configurable values are used to calculate the weight:
<setting name="queryTermWeight" value="30"/>
   In one embodiment, this corresponds to the weight to give an entry added to the BST because of a search term match (which is the second case in the above four steps to generate the BST)
<setting name="titleWordWeight" value="20"/>

In one embodiment, this corresponds to the weight to give to the first word parsed from the title. Subsequent words can have their value deducted (so that as a word gets farther away from the start of the title, it has less value)

<setting name="urlWordWeight" value="30"/>

In one embodiment, this corresponds to the weight to give to the first word parsed from the URL. Subsequent words can have their value deducted (so that as a word gets farther away from the start of the URL domain, it has less value)

<setting name="perWordDecrement" value="3"/>

In one embodiment, this corresponds to the amount to deduct the weight per term beyond the first term when tokenizing the title or URL. For example, with this value at three and titleWordWeight at twenty, that means the first word in the title has weight 20, the second word in the title has weight 17, the third word has weight 14, etc.

<setting name="perVisitWeight" value="20"/>

In one embodiment, this corresponds to the amount to add to the weight per visit the user has made to the URL (multiply by visit count)

<setting name="todayWeight" value="50"/>

In one embodiment, this corresponds to the amount to add to the weight if the user visited this URL today (within the last 24 hours, based on the timestamp)

<setting name="perDayDecrement" value="5"/>

In one embodiment, this corresponds to the amount to deduct from the weight per day it has been since the user visited this URL (so if he visited three days ago, deduct '15' from 'todayWeight' if this value is set to 5)

In one embodiment, weight values are not negative. In one embodiment, if a predetermined number of words are found in a title or URL while tokenizing the title or URL that the words begin to have a zero or negative value according to these rules, then tokenization aborts early rather than adding negative numbers to the weight.

Similarly, if a web site was visited so long ago that todayWeight (days_since_visit*perDayDecrement) is negative, in one embodiment that entry gets no weight bonus from having been visited.

In one embodiment, the BSTs are generated at the personalized navigation module's initialization time, and are augmented as needed (due to new entries or changing visit or timestamp counts due to activity while the user uses the computing device 107). The actual act of matching then becomes the act of taking the term-based BST and finding all term(s) that are a subset of whatever the user has typed into the search area. For example, consider the data set from earlier:

```
<visits>
    <entry key="http://www.nada.org/"
    visits="3" lastVisit="Thu, 07 Aug 2008
    10:40:40 GMT" title="National
    Automobile Dealers Association"
    terms="nada;"/>
    <entry key="http://www.alleyinsider.com/"
    visits="1" lastVisit="Thu, 07 Aug
    2008 10:53:01 GMT" title="Silicon Alley Insider"/>
    <entry key="http://www.corvettemuseum.com/"
    visits="2" lastVisit="Thu, 07
    Aug 2008 14:28:09 GMT" title="National
    Corvette Museum" terms="corvette;"/>
    <entry key="http://www.cnn.com/"
    visits="2" lastVisit="Thu, 07 Aug 2008
    15:25:59 GMT" title="CNN.com - Breaking
```

-continued

```
    News, U.S., World, Weather,
    Entertainment & Video News"/>
</visits>
```

In one embodiment, the terms that are tokenized include:

http://www.nada.org→nada, national, automobile, dealers, association http://www.alleyinsider.com→alleyinsider, silicon, alley, insider http://corvettemuseum.com→corvettemuseum, national, corvette, museum http://cnn.com→cnn, breaking, news, world, weather, entertainment, video (U and S may be dropped because one-letter wide words are not, in one embodiment, considered)

So, if the user types "na," that would be a hit for "nada" and "national", meaning both http://www.nada.org as well as http://corvettemuseum.com would be considered matches. In one embodiment, matching is restricted in the following additional ways in order to increase the relevancy of results shown by the personalized navigation module 105:

1. Minimum trigger character threshold. Currently, if one letter is typed in the personalized navigation module search box, it can match to any token that starts with that letter, resulting in many false positives (e.g. typing 't' could match to 'train', 'terminal', or 'table'). In one embodiment, a three-character threshold is established, such that at least three characters must be typed to result in a match.

2. Matching time behavior changes. In one embodiment, while entries in the XML file can become too old to be matched (due to the perDayDecrement mentioned above), they cannot be too young to be matched. In one embodiment, those entries added to the XML file are restricted (by clicking on a search result from a search result page) from being matched unless they are at least a predetermined amount of time (e.g., 2 hours) old, because otherwise if the user is still in the process of looking for the same content, they may mistakenly click on things they already saw because the personalized navigation module 105 has started to record it. In one embodiment, the "too old" threshold is eliminated, based on estimates of the probability of matches being of use to the end user.

Figure 3:
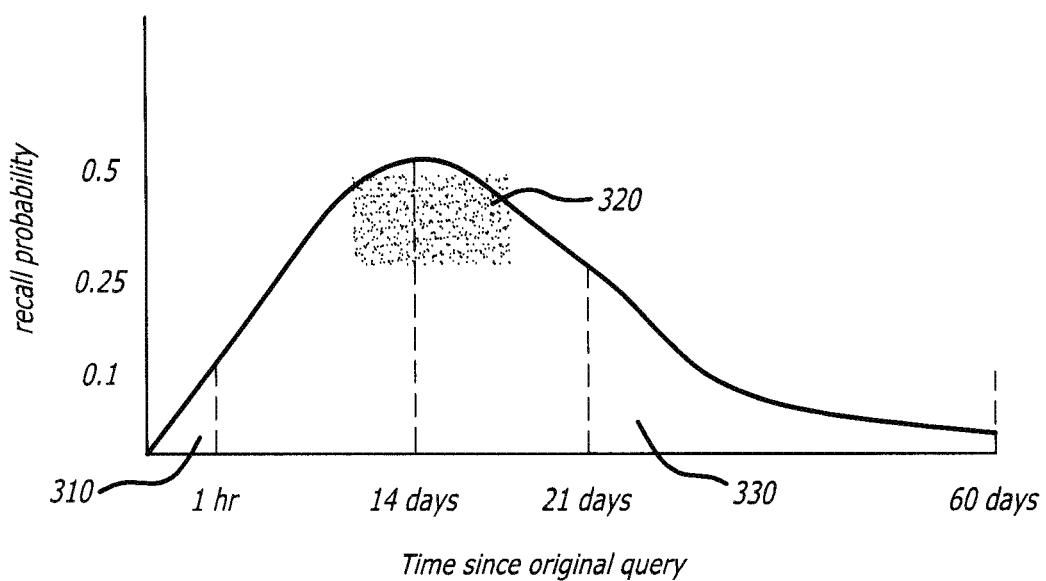
FIG. 3 is a graph of a recall probability versus time since an original query in accordance with an embodiment of the present disclosure.

A graph of an embodiment of the recall probability versus time since the original query is shown in FIG. 3. In a first section 310 below one hour, the probability is less than 0.1 and hence likely not significant enough to yield a personalized navigational result unless other matching techniques were perfect matches. In one embodiment, the probability is zero below ten seconds. In one embodiment, a second section 320 is the section of interest and can include, for example, four days to sixteen days. In one embodiment, a third section 330 includes after 21 days and the probability begins to drop quickly (but it does not drop to zero—it is not binary). In one embodiment, both of these two behaviors are defined using setting options (e.g., settings "personalizedTriggerChars" and "searchTimeDelay").

Once the personalized navigation module 105 has a set of matches, the personalized navigation module 105 sorts them based on the previously computed weight value. For instance, using the same example above and the values shown in the XML setting snippet above, the weight values would have been:

http://www.nada.org (nada)→30 (first URL word)+60 (visits)+50 (last visit today)=140 http://www.nada.org (national)→20 (first title word)+60 (visits)+50 (last visit today)=130 http://www.corvettemuseum.com (national)→20 (first title word)+40 (visits)+50 (last visit today)=110

Thus, the items would go into the list sorted with http://www.nada.org first, followed by http://www.corvettemuseum.com. In one embodiment, duplicates are eliminated before being displayed. In one embodiment, the personalized navigation module 105 is designed to show a maximum of one personalized nav result. In this embodiment, http://www.nada.org is displayed. In a further embodiment, a personalized nav result is not served with fewer than two visits or a timestamp older than 21 days.

Figure 4:
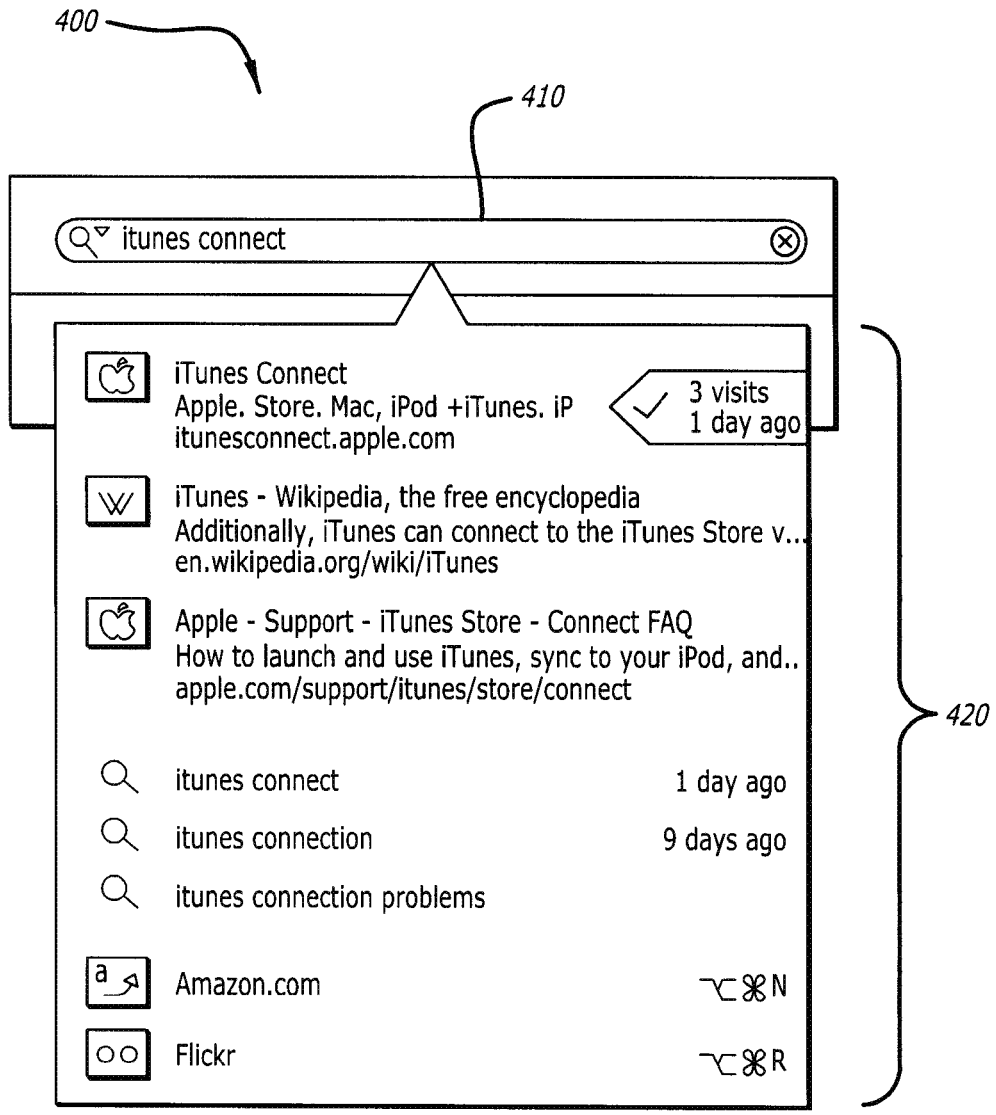
FIG. 4 is a screen shot of output produced by the personalized navigation module of FIG. 1 in accordance with an embodiment of the present disclosure.

FIG. 4 shows a screen shot 400 of the output produced by the personalized navigation module 105 of FIG. 1. As a user of the computing device 107 types in the word "personalized" in a search area 410, the personalized navigation module 105 produces output 420 which lists different web site links related to the entered search term. The web site links of the output 420 include a URL and additional information associated with the web site link. This additional information can include, for example, the number of times that the URL has been visited by the user, timestamp of most recent visit by the user, title of the each web site at the URL, and search term used to reach the URL.

Figure 5:
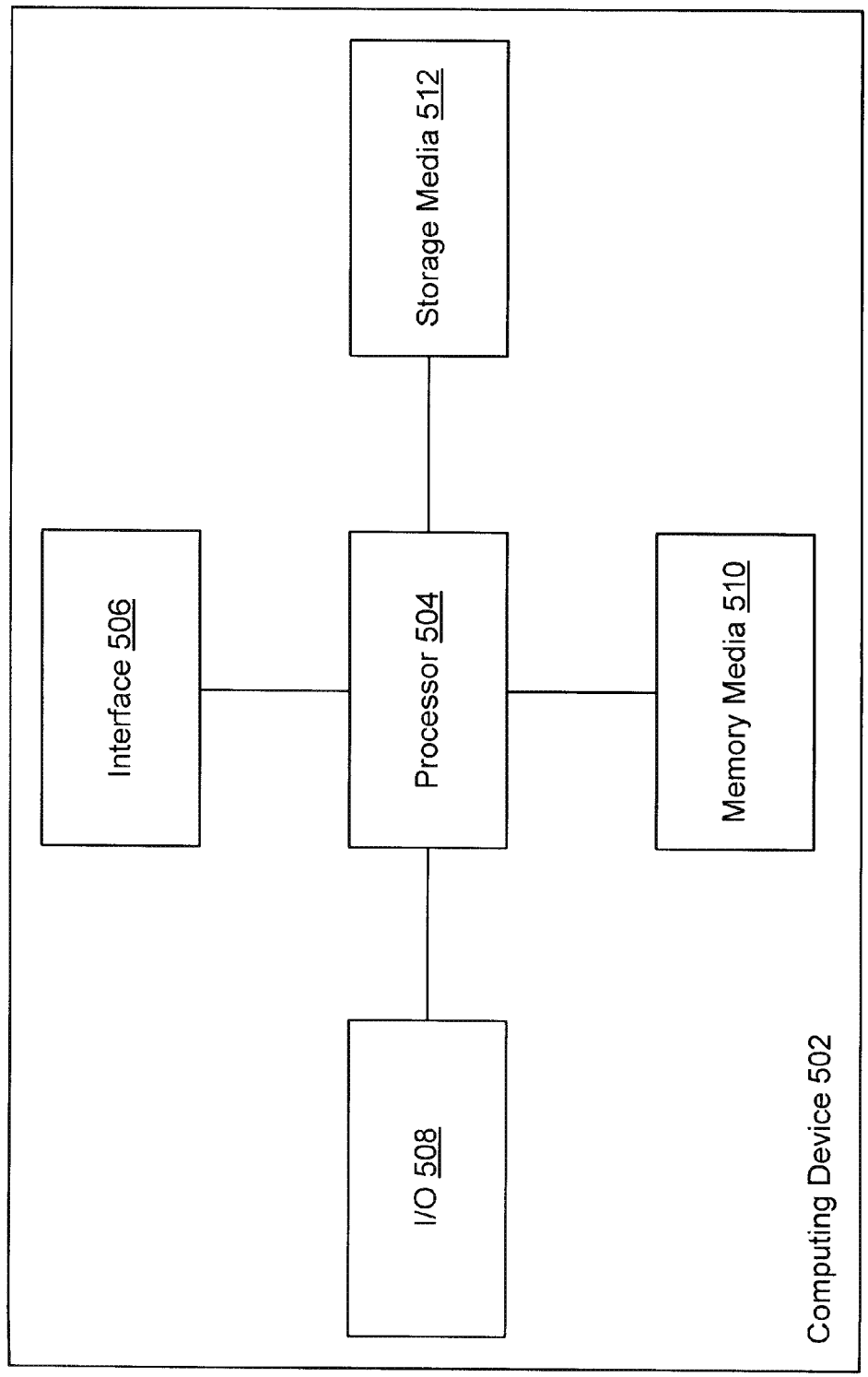
FIG. 5 is a high level block diagram of a computing device in accordance with an embodiment of the present disclosure.

The description herewith describes the present invention in terms of the processing steps required to implement an embodiment of the invention. These steps can be performed by an appropriately programmed computing device or computer, the configuration of which is well known in the art. An appropriate computing device can be implemented, for example, using well known computer processors, memory units, storage devices, computer software, and other components. A high level block diagram of such a computing device is shown in FIG. 5. Computing device 502 is an example of computing device 107 and contains a processor 504 which controls the overall operation of computing device 502 by executing computer program instructions which define such operation. The computer program instructions can be tangibly stored in a storage media 512 (e.g., magnetic or optical disk or other computer readable medium now known or to become known) and loaded into memory media 510 or read directly from media 510 when execution of the computer program instructions is desired. Computing device 502 also includes one or more interfaces 506 for communicating with other devices (e.g., locally or via a network). Computing device 502 also includes input/output 508 which represents devices which allow for user interaction with the computing device 502 (e.g., display, keyboard, mouse, speakers, buttons, etc.).

One skilled in the art will recognize that an implementation of an actual computing device will contain other components as well, and that FIG. 5 is a high level representation of some of the components of such a computing device for illustrative purposes, which may be, for example, a personal computer, PDA, wireless device, internet appliance, cellular telephone, or such processor driven technology. In addition, the processing steps described herein can also be implemented using dedicated hardware, the circuitry of which is configured specifically for implementing such processing steps. Alternatively, the processing steps can be implemented using various combinations of hardware, firmware and software.

Those skilled in the art will recognize that the methods and systems of the present disclosure can be implemented in many manners and as such are not to be limited by the foregoing exemplary embodiments and examples. In other words, functional elements being performed by single or multiple components, in various combinations of hardware and software or firmware, and individual functions, can be distributed among software applications at either the first or second computers or server or both. In this regard, any number of the features of the different embodiments described herein can be combined into single or multiple embodiments, and alternate embodiments having fewer than, or more than, all of the features described herein are possible. Functionality can also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that can be made to the hardware or software or firmware components described herein as would be understood by those skilled in the art now and hereafter.

The foregoing Description is to be understood as being in every respect illustrative and exemplary, but not restrictive, and the scope of the invention disclosed herein is not to be determined from the Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method comprising:

receiving, by a computer accessible via a network and having a display, input from a user via a web address bar to navigate to a web site;

navigating to the web site by the computer;

storing, by the computer, information about the web site in a file unless predetermined characteristics of actions performed by the user on the web site once the user has navigated to the web site are present;

repeating, by the computer, the navigating and storing steps for each requested web site;

generating, by the computer, a first binary search tree based on the file, the first binary search tree including a first plurality of keys corresponding to keywords, wherein each key of the first plurality of keys is associated with one or more URLs;

generating, by the computer, a second binary search tree based on the file, the second binary search tree including a second plurality of keys corresponding to URLs, wherein each key of the second plurality of keys is associated with metadata associated with a respective URL;

receiving, by the computer, a search query of the user as the search query is being entered by the user into a search area of a visibly displayed user interface of an application program executed by the computer, the search area separate from the web address bar;

retrieving, by the computer from the first binary search tree, a plurality of URLs associated with one or more keywords included in the search query;

retrieving, by the computer from the second binary search tree, metadata associated with the plurality of URLs; and displaying, by the computer, web site links corresponding to the plurality of URLs to be visibly displayed on the display as the search query is being entered, the web site links comprising, in addition to the URLs associated with the previously navigated web sites, information previously collected for the web sites and available via the network, the information comprising a timestamp of a most recent visit to the previously navigated web sites by the user.

2. The method of claim 1, wherein each of the plurality of binary search trees has a key and a corresponding piece of data.

3. The method of claim 1, wherein the metadata for the associated web sites comprises visits to the web sites.

4. The method of claim 1, wherein the metadata for the associated web sites comprises timestamps.

5. The method of claim 1, wherein one of the binary search trees comprises each entry from the file once.

6. The method of claim 1, wherein another one of the binary search trees is sorted by terms that a user types into the search area.

7. The method of claim 1, wherein each of the plurality of binary search trees comprises a weight associated with the URL.

8. The method of claim 7, wherein the weight is a non-negative number.

9. A computer system comprising:
a processor;
a display;
a storage medium for tangibly storing thereon program logic for execution by the processor, the program logic comprising:
receiving logic executed by the processor for receiving, via a network, input from a user via a web address bar to navigate to a web site;
navigating logic executed by the processor for navigating to the web site;
storing logic executed by the processor for storing information about the web site in a file unless predetermined characteristics of actions performed by the user on the web site once the user has navigated to the web site are present;
repeating logic executed by the processor for repeating the navigating and storing steps for each requested web site;
first generating logic executed by the processor for generating a first binary search tree based on the file, the first binary search tree including a first plurality of keys corresponding to keywords, wherein each key of the first plurality of keys is associated with one or more URLs;
second generating logic executed by the processor for generating a second binary search tree based on the file, the second binary search tree including a second plurality of keys corresponding to URLs, wherein each key of the second plurality of keys is associated with metadata associated with a respective URL;
search query web site determining logic executed by the processor for receiving a search query of the user as the search query is being entered by the user into a search area of a visibly displayed user interface of an application program executed by the computer, the search area separate from the web address bar;

first retrieving logic executed by the processor for retrieving, from the first binary search tree, a plurality of URLs associated with one or more keywords included in the search query;
second retrieving logic executed by the processor for retrieving, from the second binary search tree, metadata associated with the plurality of URLs; and
link displaying logic executed by the processor for, displaying web site links corresponding to the plurality of URLs to be visibly displayed on the display as the search query is being entered, the web site links comprising, in addition to the URLs associated with the previously navigated web sites, information previously collected for the web sites and available via the network, the information comprising a timestamp of a most recent visit to the previously navigated web sites by the user.

10. The computer system of claim 9, wherein each of the plurality of binary search trees has a key and a corresponding piece of data.

11. The computer system of claim 9, wherein the metadata for the associated web sites comprises visits to the web sites.

12. The computer system of claim 9, wherein the metadata for the associated web sites comprises timestamps.

13. The computer system of claim 9, wherein one of the binary search trees comprises each entry from the file once.

14. The computer system of claim 9, wherein another one of the binary search trees is sorted by terms that a user types into the search area.

15. The computer system of claim 9, wherein each of the plurality of binary search trees comprises a weight associated with the URL.

16. The computer system of claim 15, wherein the weight is a non-negative number.

17. A non-transitory computer readable storage medium tangibly storing computer program instructions capable of being executed by a processor of a computer system, the computer program instructions defining the steps of:
receiving, by the processor via a network, input from a user via a web address bar to navigate to a web site;
navigating, by the processor, the computer system to the web site;
storing, by the processor, information about the web site in a file unless predetermined characteristics of actions performed by the user on the web site once the user has navigated to the web site are present;
repeating, by the processor, the navigating and storing steps for each requested web site;
generating, by the processor, a first binary search tree based on the file, the first binary search tree including a first plurality of keys corresponding to keywords, wherein each key of the first plurality of keys is associated with one or more URLs;
generating, by the processor, a second binary search tree based on the file, the second binary search tree including a second plurality of keys corresponding to URLs, wherein each key of the second plurality of keys is associated with metadata associated with a respective URL;
receiving, by the processor, a search query of the user as the search query is being entered by the user into a search area of a visibly displayed user interface of an application program executed by the computer, the search area separate from the web address bar;
retrieving, by the processor from the first binary search tree, a plurality of URLs associated with one or more keywords included in the search query;

retrieving, by the processor from the second binary search tree, metadata associated with the plurality of URLs; and displaying, by the processor, web site links corresponding to the plurality of URLs to be visibly displayed on a display of the computer system as the search query is being entered, the web site links comprising, in addition to the URLs associated with the previously navigated web sites, information previously collected for the web sites and available via the network, the information comprising a timestamp of a most recent visit to the previously navigated web sites by the user.

18. The non-transitory computer readable storage medium of claim 17, wherein the metadata for the associated web sites comprises visits to the web sites.

19. The non-transitory computer readable storage medium of claim 17, wherein the metadata for the associated web sites comprises timestamps.

\* \* \* \* \*